(No Model.)

A. SHEPARD.
PRUNING SHEARS.

No. 309,889. Patented Dec. 30, 1884.

Witnesses.
John Edwards Jr.
Eddy N. Smith

Inventor.
Amos Shepard
By James Shepard.
Atty.

UNITED STATES PATENT OFFICE.

AMOS SHEPARD, OF PLANTSVILLE, ASSIGNOR TO THE PECK, STOW & WILCOX COMPANY, OF SOUTHINGTON, CONNECTICUT.

PRUNING-SHEARS.

SPECIFICATION forming part of Letters Patent No. 309,889, dated November 30, 1884.

Application filed June 11, 1884. (No model.)

*To all whom it may concern:*

Be it known that I, AMOS SHEPARD, a citizen of the United States, residing at Plantsville, in the county of Hartford and State of Connecticut, have invented certain new and useful Improvements in Pruning-Shears, of which the following is a specification.

My invention relates to improvements in pruning-shears of the class which are thrown open by a spring, and held closed by means of a catch or latch.

The object of my invention is to produce shears of said class with the catch or latch so constructed and arranged that it can be readily and effectively operated with the same hand which has hold of the handles; and I accomplish this result by the simple mechanism illustrated in the accompanying sheet of drawings, in which—

Figure 1:
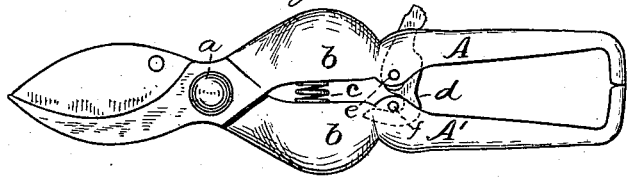
Figure 2:
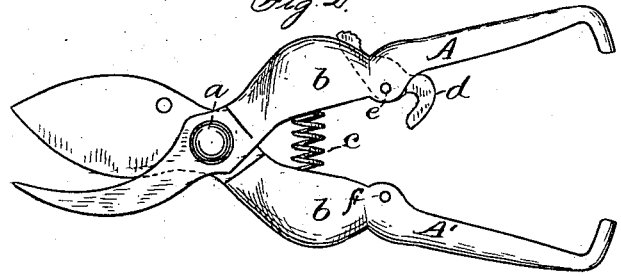
Figure 3:
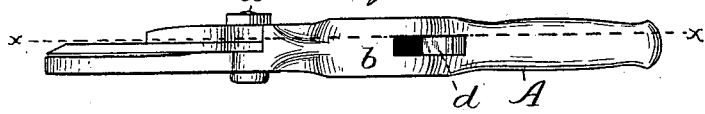
Figure 4:
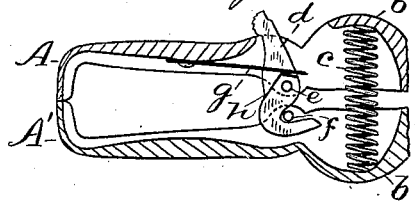

Figure 1 is a side elevation of my improved pruning-shears closed. Fig. 2 is a like view showing the shears when opened. Fig. 3 is a plan view thereof, and Fig. 4 is a partial vertical section on line $x$ $x$ of Fig. 3, part $y$ in elevation.

Pruning-shears are also used for trimming the hoofs of sheep.

Heretofore much difficulty has been experienced by sheep-herders and others arising from the fact that in order to fasten the blades, or vice versa, both hands have been required. This is especially inconvenient because the user oftentimes requires one hand for other uses—as, for instance, to hold the animal whose hoofs are to be trimmed.

The construction of my shears enables one to overcome all such annoyances because the shears can be picked up with one hand, and the blades unfastened or fastened by means of the thumb or forefinger of the same hand that grasps the handles. The cutting-blades may be made in any of the ordinary forms for such shears, and secured together by the pivotal bolt $a$ after the ordinary manner. The handles A A' may be made of any suitable material, though I prefer cast malleable iron. They are provided at their forward ends with enlargements $b$ $b$, for the reception of the ends of the spiral springs $c$, which spring, when properly secured in place, as illustrated most clearly in Fig. 4 of the drawings, has a constant tendency to throw the handles open. This particular feature—viz., the manner of seating and protecting the spring—is, however, made the subject of another application of even date herewith.

Any ordinary form of spring may be substituted for the spring $c$ for throwing open the blades and handles. To resist this constant pressure of the spring, I secure to the handle A by the pivot $e$ a latch or hook, $d$, which engages with the keeper on the handle A'. The latch or hook $d$ is acted upon by a spring, $g$, secured by one end at the rear of the handle A. The latch is constructed with an angle or point, so that when said point $h$ is in front of the pivot $e$ the free end of the spring $g$ presses it forward, and holds the latch out of engagement with the keeper $f$, as shown in Fig. 2. The handle A is slotted, as shown in Fig. 3, so that the end of the latch $d$ extends through to the outer side of said handle. It should also be noticed that this latch or hook is located at a point forward of the grasping-surfaces of the handles, and it is by such location that I am enabled to operate the latch by means of the thumb or forefinger of the hand which grasps the blades—a result which, so far as I am aware, has never before been attained. It will also be seen by reference to Fig. 2 that when the latch is disengaged from the keeper it is held in a position in which it cannot possibly cause any inconvenience to the operator, and the shears may be used for clipping as long as may be desired.

Whenever the user wishes to fasten the blades in their closed position for laying aside the shears, it is only necessary to press the handles together, and by the thumb or forefinger, acting upon the outer end of the latch, force said latch into engagement with the keeper, as shown in Figs. 1, 3, and 4. When in this position the point $h$ is back of the axis of the latch, so that the spring $g$ acts to hold the latch in said position.

In order to facilitate the manipulation of the latch $d$, I have illustrated its outer end as serrated or roughened; but when the form and projections of this end of the latch is such as to furnish a good hold for one's thumb or forefinger, this roughening may be omitted.

I have herein illustrated and described one form of latch in compliance with the law, which may be operated in the manner described, when placed at a point forward of the grasping-surfaces of the handles; but I do not wish to limit myself to the particular form of latch, as other forms may be located in like manner to operate with one hand in the same way.

I am aware that shears of the same class have heretofore been made with the holding-latch located at a point in rear of the grasping-surfaces of the handles, so that the latch cannot be operated by the hand which is also grasping the handles. Such shears are hereby disclaimed.

I claim as my invention—

The herein-described spring-shears, having the latch for locking the blades together at a point forward of the grasping-surfaces of the handles, substantially as described.

AMOS SHEPARD.

Witnesses:
CHARLES D. BARNES,
ALBERT T. BISHOP.